United States Patent
Chen

(10) Patent No.: US 7,881,903 B2
(45) Date of Patent: Feb. 1, 2011

(54) INTELLIGENT VEHICLE LOAD MEASURING SYSTEM AND METHOD

(75) Inventor: Yuan-Lin Chen, 84 Gungjuan Rd., Taishan, Taipei Hsien (TW)

(73) Assignee: Yuan-Lin Chen, Taishan (TW)

( * ) Notice: Subject to any disclaimer, the term of this patent is extended or adjusted under 35 U.S.C. 154(b) by 338 days.

(21) Appl. No.: 12/141,969

(22) Filed: Jun. 19, 2008

(65) Prior Publication Data
US 2008/0319698 A1 Dec. 25, 2008

(30) Foreign Application Priority Data
Jun. 22, 2007 (TW) .............................. 96122425 A

(51) Int. Cl.
*G01G 19/14* (2006.01)
(52) U.S. Cl. ..................................... 702/174
(58) Field of Classification Search ................ 702/174; 701/50; 280/5.514
See application file for complete search history.

(56) References Cited
U.S. PATENT DOCUMENTS
5,182,712 A * 1/1993 Kyrtsos et al. ................ 701/50
2003/0120455 A1 * 6/2003 Sorrells et al. .............. 702/174
2005/0077691 A1 * 4/2005 Witters .................... 280/5.514

FOREIGN PATENT DOCUMENTS
JP 2001001732 A * 1/2001

* cited by examiner

*Primary Examiner*—Tung S Lau
*Assistant Examiner*—Xiuquin Sun
(74) *Attorney, Agent, or Firm*—Guice Patents PLLC

(57) ABSTRACT

An intelligent vehicle load measuring system includes a sensor installed in the shock-absorber of every wheel of a vehicle to detect the extension length data of the associating shock-absorber when the vehicle carries a load, a calculation unit coupled to the sensors to receive the extension length data of every shock-absorber of the vehicle and to calculate the weight of the load received by each shock-absorber and the total weight and loadage of the vehicle, and a display unit electrically coupled to the calculation unit to display the load data of the vehicle. The invention involves also an intelligent vehicle load measuring method.

17 Claims, 4 Drawing Sheets

INTELLIGENT VEHICLE LOAD MEASURING SYSTEM AND METHOD

BACKGROUND OF THE INVENTION

1. Field of the Invention

The present invention relates to a vehicle load measuring system and more particularly, to an intelligent vehicle load measuring system, which has a sensor respectively installed in the shock-absorber of every wheel of a vehicle to detect the extension length data of the associating shock-absorber and utilizes a calculation unit to receive the extension length data of every shock-absorber and to calculate the weight of the load received by every shock-absorber and the total weight and loadage of the vehicle for enabling the calculated vehicle load data to be displayed on a display device. The invention relates also to an intelligent vehicle load measuring method.

2. Description of the Related Art

A vehicle (motorcycle, sedan, bus, truck, towing vehicle, etc.) has a load limit. Overloading a vehicle can significantly impair the driver's ability to steer correctly. Incorrect steering of a vehicle may cause traffic accidents or road damage. Therefore, traffic police department strictly enforces overloading regulations, preventing the occurrence of accidents.

A vehicle driver cannot know whether or not the vehicle (truck or towing vehicle) is overloaded unless the vehicle is measured through a floor weight scale. If a vehicle is overloaded, the driver will be charged for a fine. Further, overloaded vehicles threaten road safety and are contributing to many of fatal accidents on the roads.

Further, a vehicle driver cannot easily know the condition of the shock-absorbers of the vehicle. Any shock-absorber problem may be discovered only when the damage is serious or the vehicle is receiving a routine check. Because a vehicle shock-absorber is expensive, a bad mechanic may convince a driver to replace the shock-absorbers of the vehicle that are not seriously damaged.

Therefore, it is desirable to provide an intelligent vehicle load measuring system and method capable of recording the dynamic load curve of the shock-absorbers of the vehicle and the maximum transient load on each wheel during steering of the vehicle for reference by the driver and for further analysis to check the condition of the shock-absorbers. Measuring vehicle load at the same time can remind the driver to get rid of unnecessary weight to achieve the purpose of fuel-saving.

SUMMARY OF THE INVENTION

The present invention has been accomplished under the circumstances in view. It is the main object of the present invention to provide an intelligent vehicle load measuring system and method for measuring the total weight and loadage of a vehicle by means of using sensors to detect the extension length of every shock-absorber of the vehicle and a calculation unit to calculate the total weight and loadage of the vehicle for display on a display device.

To achieve this and other objects of the present invention, the intelligent vehicle load measuring system comprises at least one sensor respectively installed in the shock-absorber of every wheel of a vehicle to detect the extension length data of the shock-absorber of every wheel of the vehicle when the vehicle carries a load; a calculation unit coupled to the at least one sensor to receive the extension length data of the shock-absorber of every wheel of the vehicle and to calculate the weight of the load received by each shock-absorber of the vehicle and the total weight and loadage of the vehicle; and a display unit electrically coupled to the calculation unit to display the load data of the vehicle.

To achieve this and other objects of the present invention, the intelligent vehicle load measuring method comprises the steps of: (a) installing one sensor in the shock-absorber of every wheel of a vehicle to detect the extension length data of the associating shock-absorber when the vehicle carries a load; (b) using a calculation unit to receive the extension length data of the shock-absorber of every wheel of the vehicle from the installed sensors and to calculate the total weight and loadage of the vehicle; and (c) displaying the load data of the vehicle on a display device.

DETAILED DESCRIPTION OF THE PREFERRED EMBODIMENT

Figure 1:
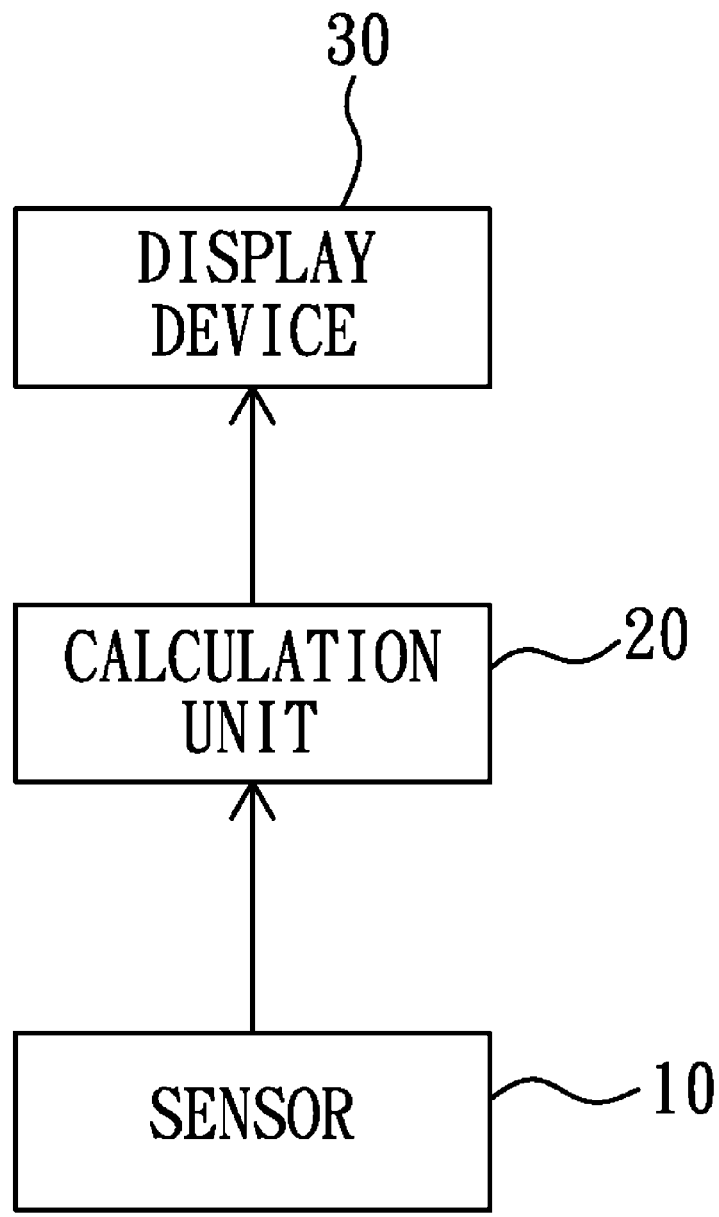
FIG. 1 is a system block diagram of an intelligent vehicle load measuring system according to the present invention.

Referring to FIG. 1, an intelligent vehicle load measuring system in accordance with the present invention is shown comprised of at least one, for example, a number of sensors 10, a calculation unit 20, and a display device 30.

The sensors 10 are respectively mounted in the shock-absorber 120 of each wheel 110 of the vehicle to be measured to detect the extension length data of the shock-absorber 120. The sensors 10 can be, but not limited to, piezoelectric sensors, photo sensors, or variable resistance sensors. According to the present preferred embodiment, each sensor 10 is a mechanical arm. When the vehicle 100 carries a load, the sensors 10 transmit the extension length data of the associating shock-absorbers 120 to the calculation unit 20 by means of a wireless or wired transmission technique.

The calculation unit 20 can be, but not limited to, a microcontroller coupled to the sensors 10 to receive the extension length data of each shock-absorber 120 for calculating the weight of the load received by each shock-absorber 120. The calculation unit 20 has high-efficiency computing ability. The calculation unit 20 has built therein at least one program (not shown) that controls the calculation unit to calculate the weight received by each shock-absorber 120 subject to Hooke's law and to further calculate the gross (total) weight of the vehicle 100 by means of adding the weight of the wheel system below the shock-absorbers 120 to the sum of the weight received by the shock-absorbers 120.

The calculation formula of Hooke's law is:

$$W_y = W_O + W_C = W_O + \sum_{i=1}^{m} k_i(\Delta L_i) \quad \text{(Formula I)}$$

in which, $W_r$ is the gross weight of the vehicle 100; $W_O$ is the net weight of the vehicle 100; $W_C$ is the weight of the load (the weight of the cargo and persons) carried on the vehicle 100; $k_i$ is the load constant of $i^{th}$ shock-absorber subject to Hooke's law; $\Delta L_i$ is the extension length data of the $i^{th}$ shock-absorber of which the unit of measurement is centimeter; m is the total number of wheels 110 of the vehicle 100 that bear the weight, normally an even number. For example, when the vehicle 100 is a regular sedan, m is 4, and the gross weight of the vehicle 100 is the sum of the net weight of the vehicle 100 (i.e., the empty vehicle weight as specified in the specification provided by the manufacturer) and the load carried on the four wheels 110.

Further, the calculation unit 20 provides a display mode and a calibration data input mode. When on the display mode, the calculation unit 20 outputs the calculated vehicle total weight data and the data of the weight the load to the display device 30 for display. When on the calibration data input mode, the driver can input a calibration load constant $k_i$ into the calculation unit 20 to assure measurement accuracy. The calibration data input mode matches with a keypad 50 described below, and the detail will be described further.

The display device 30 is coupled to the calculation unit 20 to display weight data relating the vehicle 100, such as, but not limited to, gross weight of the vehicle 100, net weight (empty vehicle weight) of the vehicle 100, loadage of the vehicle 100, dynamic load on each wheel 110 of the vehicle 100, maximum transient load, etc. The display device 30 can be, but not limited to, a LCD (liquid crystal display).

Figure 2:
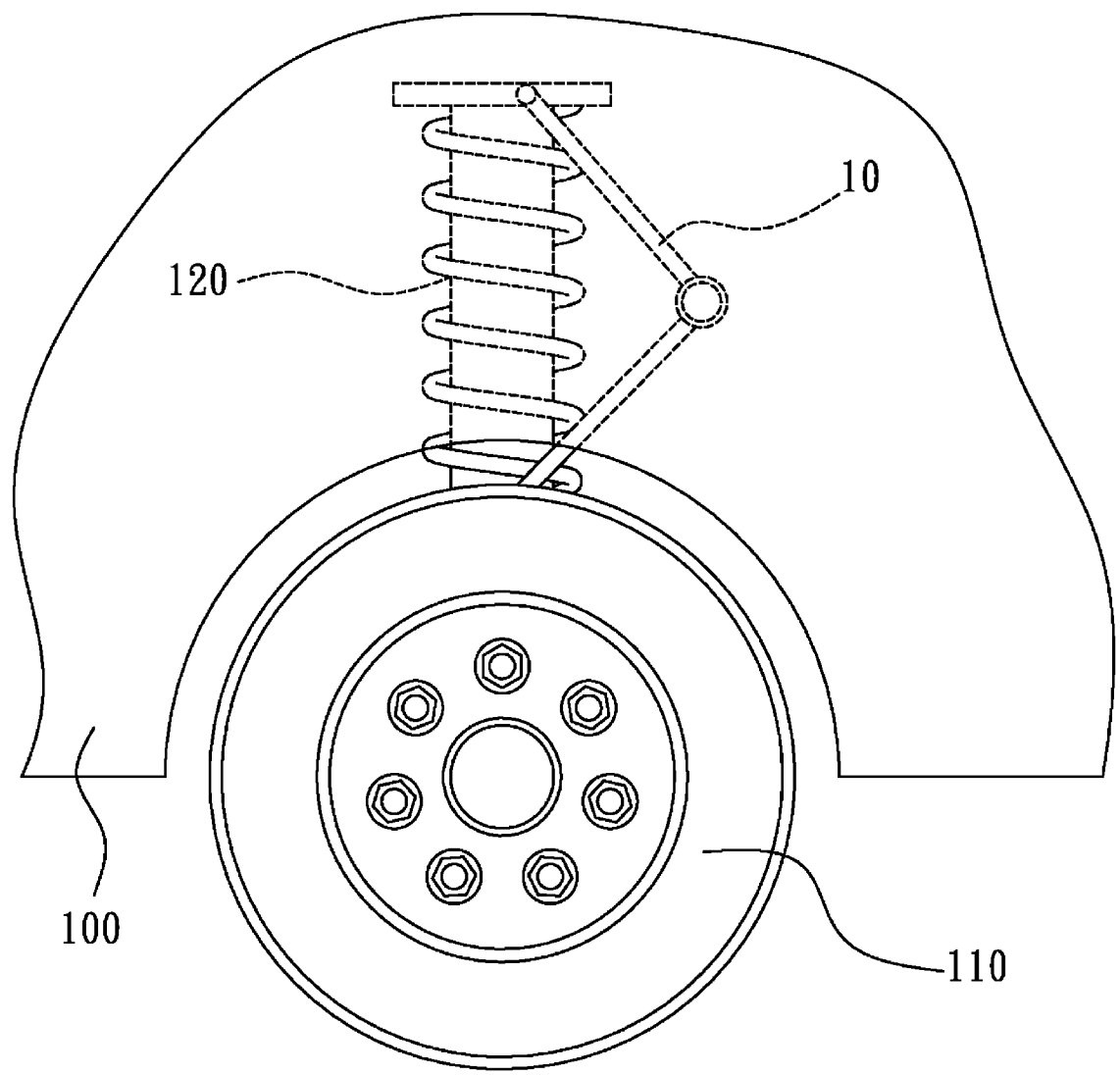
FIG. 2 is a schematic drawing showing a mechanical arm type sensor installed in the shock-absorber of one wheel of a vehicle according to the present invention.

Referring to FIG. 2, the sensor 10 is a mechanical arm connected between the two opposite ends of the associating shock-absorber 120. When the vehicle 100 carries a load, the shock-absorber 120 is compressed by the weight of the load, and the mechanical arm 10 is forced to project outwards (to reduce its contained angle). The outward projecting distance (the contained angle reducing range) of each sensor 10 varies with the weight of the load, and is indicative of the extension length of the associating shock-absorber 120. Therefore, the extension length data of every shock-absorber 120 can be obtained and then transmitted to the calculation unit 20 by means of a wireless or wired transmission technique for enabling the calculation unit 20 to calculate the weight received by every shock-absorber 120 and to further calculate the gross weight of the vehicle.

Figure 3:
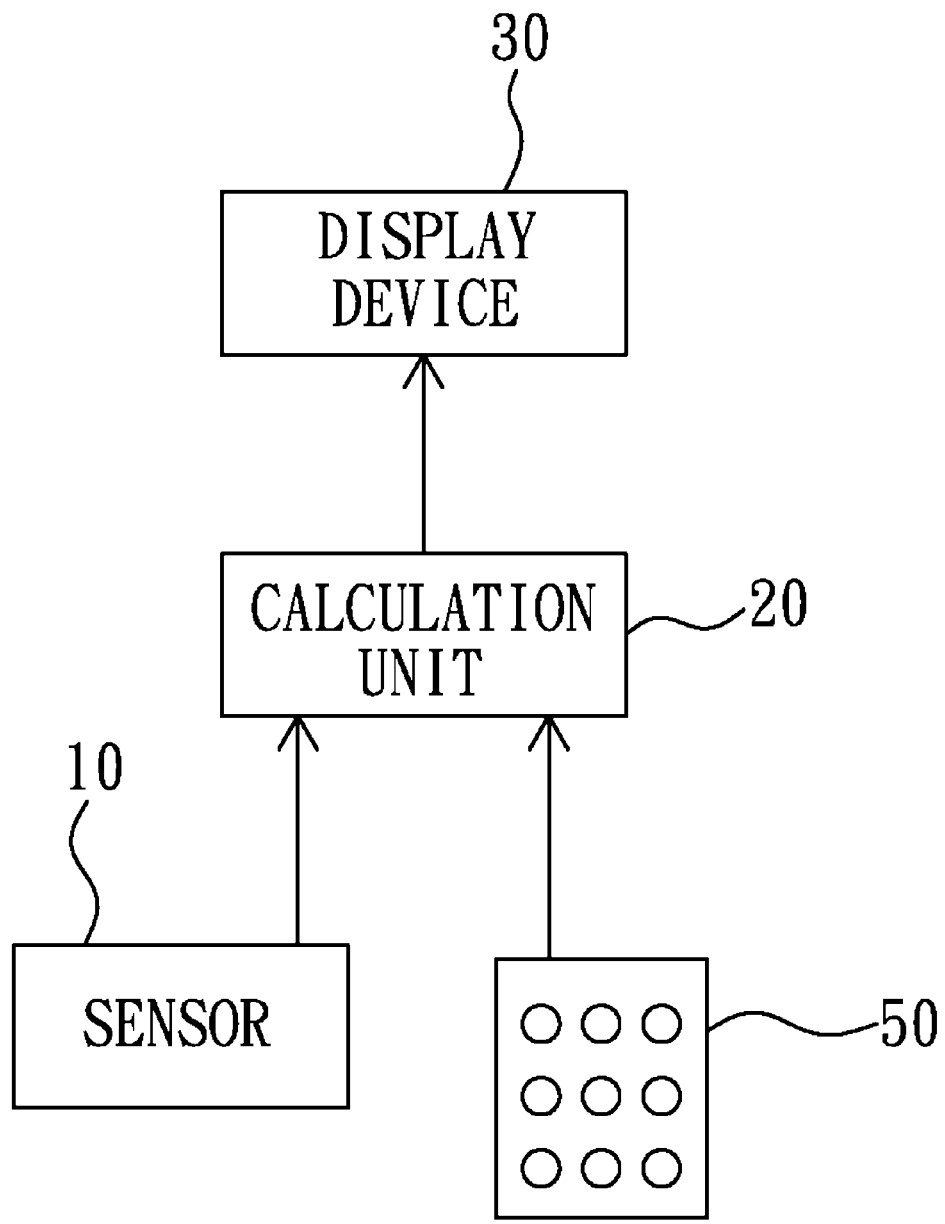
FIG. 3 corresponds to FIG. 1, showing a keypad coupled to the calculation unit.

Referring to FIG. 3, the intelligent vehicle load measuring system further comprises a keypad 50, which is coupled to the calculation unit 20 for allowing the driver to input a calibration load constant $k_i$ and the net weight of the vehicle $W_O$ into the calculation unit 20 when the calculation unit 20 is on the calibration data input mode, assuring measurement accuracy. The calculation unit 20 and the keypad 50 can be incorporated into a touch screen LCD monitor, thereby saving space.

As stated above, the intelligent vehicle load measuring system has one sensor 10 installed in each shock-absorber 120 of the vehicle 100 to detect the extension length data of every shock-absorber 120 when the vehicle 100 carries a load, and utilizes a calculation unit 20 to calculate the gross weight and loadage of the vehicle 100 and a display device 30 to display the measured data, so that the driver of the vehicle 100 knows the vehicle load data and the pressure bearing status of every shock-absorber 120. Therefore, the invention eliminates the drawbacks of the prior art techniques.

Figure 4:
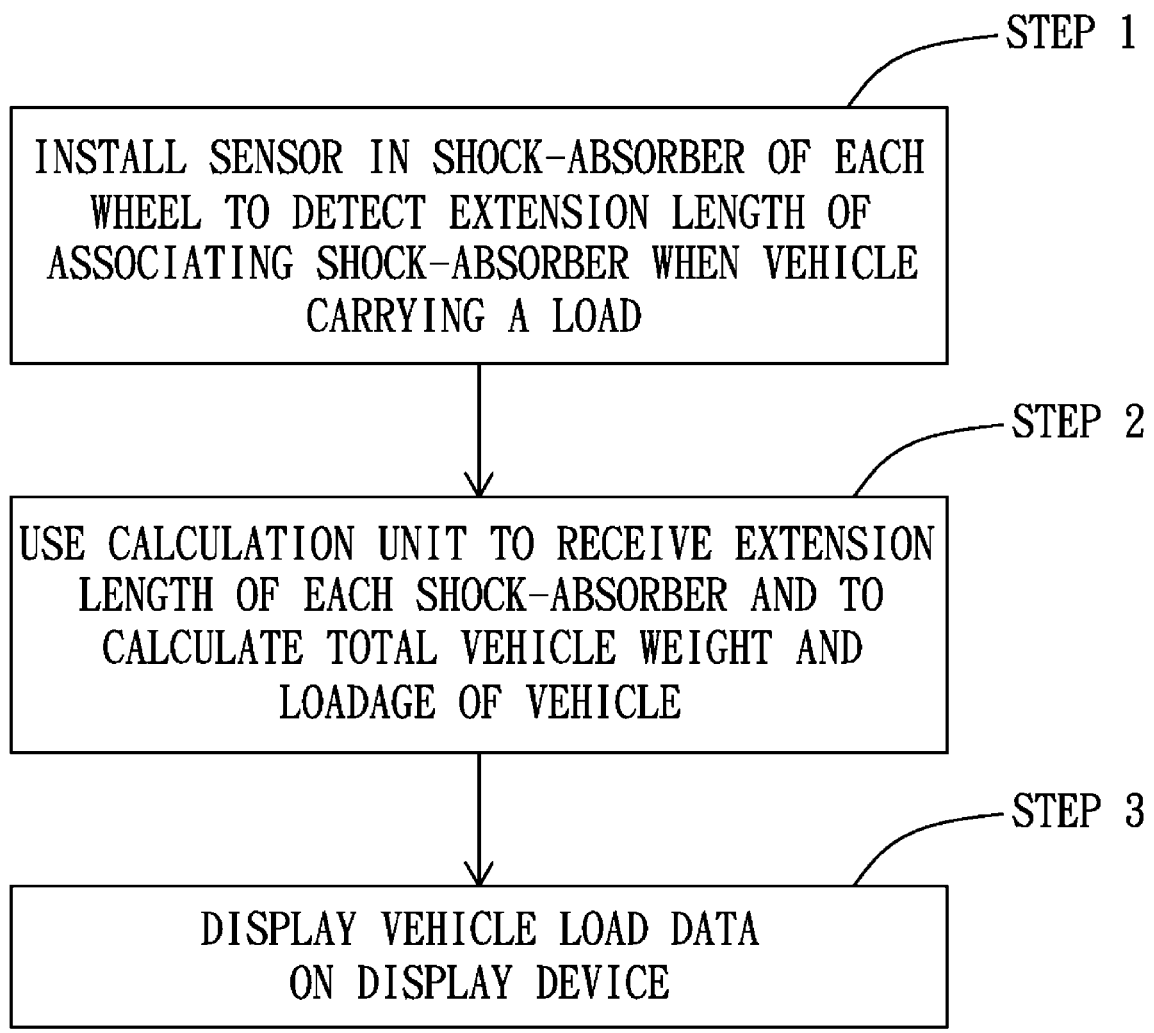
FIG. 4 is a flow chart of an intelligent vehicle load measuring method according to the present invention.

The invention also provides an intelligent vehicle load measuring method. As shown in FIG. 4, the intelligent vehicle load measuring method includes the steps of: (a) installing one sensor 10 in the shock-absorber 120 of every wheel 110 of the vehicle 100 to be measured to detect the extension length data of the associating shock-absorber 120 when the vehicle 100 carries a load, (b) using a calculation unit 20 to receive the extension length data of the shock-absorber 120 of every wheel 110 of the vehicle 100 from the installed sensors 10 and to calculate the gross (total) weight and loadage of the vehicle 100, and (c) displaying the load data of the vehicle 100 on a display device 30.

In step (a), one sensor 10 is installed in the shock-absorber 120 of every wheel 110 of the vehicle 100 to detect the extension length data of the associating shock-absorber 120 when the vehicle 100 carries a load. The sensors 10 can be, but not limited to, piezoelectric sensors, photo sensors, or variable resistance sensors. According to the present preferred embodiment, each sensor 10 is a mechanical arm. However, the mechanical arm is not a limitation.

In step (b), a calculation unit 20 is used to receive the extension length data of the shock-absorber 120 of every wheel 110 of the vehicle 100 from the installed sensors 10 and to calculate the gross (total) weight of the vehicle 100. The calculation unit 20 can be, but not limited to, a microcontroller. The calculation unit 20 receives the extension length data of each shock-absorber 120 from the sensors 10 by a wired or wireless communication technique for calculating the weight of the load received by each shock-absorber 120. The calculation unit 20 has high-efficiency computing ability. The calculation unit 20 has built therein at least one program (not shown) that controls the calculation unit to calculate the weight received by each shock-absorber 120 subject to Hooke's law and to further calculate the gross (total) weight of the vehicle 100 by means of adding the weight of the wheel system below the shock-absorbers 120 to the sum of the weight received by the shock-absorbers 120.

In step (c), the load data of the vehicle 100 is displayed on a display device 30. The display device 30 displays the load data of the vehicle 100, such as, but not limited to, gross weight of the vehicle 100, net weight (empty vehicle weight) of the vehicle 100, loadage of the vehicle 100, dynamic load on each wheel 110 of the vehicle 100, maximum transient load on each wheel 110 of the vehicle 100, etc. The display device 30 can be, but not limited to, a LCD (liquid crystal display).

The intelligent vehicle load measuring method further includes step (d) enabling the calculation unit 20 to provide a display mode and a calibration data input mode so that the driver of the vehicle is allowed to input a calibration load constant Ki and the net weight of the vehicle $W_O$ into the calculation unit 20 under the calibration data input mode, assuring measurement accuracy.

As stated above, the intelligent vehicle load measuring method has one sensor 10 installed in each shock-absorber 120 of the vehicle 100 to detect the extension length data of every shock-absorber 120 when the vehicle 100 carries a load, and utilizes a calculation unit 20 to calculate the gross weight and loadage of the vehicle 100 and a display device 30 to display the measured data, so that the driver of the vehicle 100 knows the vehicle load data and the pressure bearing status of every shock-absorber 120. Therefore, the invention eliminates the drawbacks of the prior art techniques.

Although a particular embodiment of the invention has been described in detail for purposes of illustration, various modifications and enhancements may be made without departing from the spirit and scope of the invention.

What is claimed is:

1. An intelligent vehicle load measuring system, comprising:
   at least one sensor respectively installed in the shock-absorber of every wheel of a vehicle to detect the extension length data of the shock-absorber of every wheel of said vehicle when said vehicle carries a load;
   a calculation unit coupled to said at least one sensor to receive the extension length data of the shock-absorber of every wheel of said vehicle and to calculate the weight of the load received by each shock-absorber of said vehicle and the total weight and loadage of the vehicle, said calculation unit is a microcontroller, and said calculation unit provides a display mode for displaying the load data of said vehicle, and a calibration data input mode for input of a calibration load constant;

a display unit electrically coupled to said calculation unit to display the load data of said vehicle; and a keypad means coupled to said calculation unit for inputting a calibration load constant $K_i$ and the net weight of the vehicle $W_o$ into said calculation unit when said calculation unit is under said calibration data input mode.

2. The intelligent vehicle load measuring system as claimed in claim 1, wherein each said sensor is selected from the group of piezoelectric sensor, photo sensor, variable resistance sensor and mechanical arm.

3. The intelligent vehicle load measuring system as claimed in claim 1, wherein each said sensor transmits the detected extension length data of the associating shock-absorber to said calculation unit through a wired connection.

4. The intelligent vehicle load measuring system as claimed in claim 1, wherein each said sensor transmits the detected extension length data of the associating shock-absorber to said calculation unit through a wireless connection.

5. The intelligent vehicle load measuring system as claimed in claim 1, wherein said calculation unit has built therein a program that controls said calculation unit to calculate the weight of the load received by each shock-absorber of said vehicle subject to a calculation formula of Hooke's law and to further calculate the total weight of said vehicle by means of adding the net weight of said vehicle to the sum of the weight of the load received by the shock-absorbers of said vehicle.

6. The intelligent vehicle load measuring system as claimed in claim 5, wherein said calculation formula of Hooke's law is:

$$W_\gamma = W_O + W_C = W_O + \sum_{i=1}^{m} k_i(\Delta L_i) \quad \text{(Formula I)}$$

in which, $W_\gamma$ is the gross weight of said vehicle; $W_O$ is the net weight of said vehicle; $W_C$ is the weight of the load including cargo and persons carried on said vehicle; $k_i$ is the load constant of $i^{th}$ shock-absorber subject to Hooke's law; $\Delta L_i$ is the extension length data of the $i^{th}$ shock-absorber of which the unit of measurement is centimeter; m is the total number of wheels of said vehicle, which is an even number.

7. The intelligent vehicle load measuring system as claimed in claim 6, wherein the load data comprises the total weight of said vehicle, the net weight of said vehicle, the loadage of said vehicle, the load received by every wheel of said vehicle and the maximum transient load of every wheel of said vehicle.

8. The intelligent vehicle load measuring system as claimed in claim 1, wherein said display device is a LCD, and said keypad means is incorporated with said display device into a touch screen LCD monitor.

9. An intelligent vehicle load measuring method, comprising the steps of:

(a) installing one sensor in the shock-absorber of every wheel of a vehicle to detect the extension length data of the associating shock-absorber when said vehicle carries a load;

(b) using a calculation unit to receive the extension length data of the shock-absorber of every wheel of said vehicle from the installed sensors and to calculate the total weight and loadage of said vehicle; and (c) displaying the load data of said vehicle on a display device;

wherein said calculation unit provides a display mode for displaying the load data of said vehicle, and a calibration data input mode for input of a calibration load constant $K_i$ and the net weight of the vehicle $W_O$.

10. The intelligent vehicle load measuring method as claimed in claim 9, wherein each said sensor is selected from the group of piezoelectric sensor, photo sensor, variable resistance sensor and mechanical arm.

11. The intelligent vehicle load measuring method as claimed in claim 9, wherein each said sensor transmits the detected extension length data of the associating shock-absorber to said calculation unit through a wired connection.

12. The intelligent vehicle load measuring method as claimed in claim 11, wherein each said sensor transmits the detected extension length data of the associating shock-absorber to said calculation unit through a wireless connection.

13. The intelligent vehicle load measuring method as claimed in claim 9, further comprising the step of (d) having a program built in said calculation unit for controlling said calculation unit to calculate the weight of the load received by each shock-absorber of said vehicle subject to a calculation formula of Hooke's law and to further calculate the total weight of said vehicle by means of adding the net weight of said vehicle to the sum of the weight of the load received by the shock-absorbers of said vehicle.

14. The intelligent vehicle load measuring method as claimed in claim 13, wherein said calculation formula of Hooke's law is:

$$W_\gamma = W_O + W_C = W_O + \sum_{i=1}^{m} k_i(\Delta L_i) \quad \text{(Formula I)}$$

in which, $W_\gamma$ is the gross weight of said vehicle; $W_O$ is the net weight of said vehicle; $W_C$ is the weight of the load including cargo and persons carried on said vehicle; $k_i$ is the load constant of $i^{th}$ shock-absorber subject to Hooke's law; $\Delta L_i$ is the extension length data of the $i^{th}$ shock-absorber of which the unit of measurement is centimeter; m is the total number of wheels of said vehicle, which is an even number.

15. The intelligent vehicle load measuring method as claimed in claim 14, wherein the load data comprises the total weight of said vehicle, the net weight of said vehicle, the loadage of said vehicle, the load received by every wheel of said vehicle and the maximum transient load of every wheel of said vehicle.

16. The intelligent vehicle load measuring method as claimed in claim 9, wherein said calculation unit is a microcontroller.

17. The intelligent vehicle load measuring method as claimed in claim 9, wherein said display device is a LCD.

* * * * *